(12) United States Patent
Zdepski

(10) Patent No.: US 10,244,288 B2
(45) Date of Patent: *Mar. 26, 2019

(54) AUTOMATED INPUT IN AN INTERACTIVE TELEVISION SYSTEM

(71) Applicant: OpenTV, Inc., San Francisco, CA (US)

(72) Inventor: Joel Zdepski, Mountain View, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,100

(22) Filed: Jun. 6, 2016

(65) Prior Publication Data

US 2017/0041672 A1 Feb. 9, 2017

Related U.S. Application Data

(63) Continuation of application No. 14/195,249, filed on Mar. 3, 2014, now Pat. No. 9,438,958, which is a (Continued)

(51) Int. Cl.
*H04N 7/16* (2011.01)
*H04N 21/478* (2011.01)
(Continued)

(52) U.S. Cl.
CPC .......... *H04N 21/478* (2013.01); *H04N 7/165* (2013.01); *H04N 21/4722* (2013.01);
(Continued)

(58) Field of Classification Search
CPC .............. H04N 21/235; H04N 21/435; H04N 21/2365; H04N 5/4401; H04N 7/10
(Continued)

(56) References Cited

U.S. PATENT DOCUMENTS 5,390,314 A 2/1995 Swanson
5,572,643 A 11/1996 Judson
(Continued)

FOREIGN PATENT DOCUMENTS

CA 2450864 A1 12/2002
DE 3623925 A1 1/1988
(Continued)

OTHER PUBLICATIONS

U.S. Appl. No. 09/885,793, filed Jun. 19, 2001, Automated Input in an Interactive Television System, U.S. Pat. No. 8,667,553.
(Continued)

*Primary Examiner* — Annan Q Shang
(74) *Attorney, Agent, or Firm* — Schwegman Lundberg & Woessner, P.A.

(57) ABSTRACT

A method and system for employing automated user input for an interactive application associated with a media program is presented. In an example embodiment, a method includes receiving, at a receiving device from a media content system via a network, a media program and an interactive application associated with the media program. Execution of the application is initiated during the receiving of the program. Based on the execution, a user interface configured to receive a user input to view added content via the application is presented. A script is executed to provide the user input to the application to provide the added content with the program. Based on the execution of the application and the user input, the added content is provided with the program. During the receiving of the program, the program and the added content are recorded for presentation to the user after the recording.

20 Claims, 10 Drawing Sheets

Related U.S. Application Data continuation of application No. 09/885,793, filed on Jun. 19, 2001, now Pat. No. 8,667,553.

(51) Int. Cl.
| | |
|---|---|
| *H04N 21/4722* | (2011.01) |
| *H04N 21/845* | (2011.01) |
| *H04N 21/854* | (2011.01) |
| *H04N 21/8545* | (2011.01) |
| *H04N 21/81* | (2011.01) |

(52) U.S. Cl.
CPC ..... *H04N 21/8173* (2013.01); *H04N 21/8453* (2013.01); *H04N 21/854* (2013.01); *H04N 21/8545* (2013.01)

(58) Field of Classification Search
USPC .......................................... 725/68, 131–142
See application file for complete search history.

(56) References Cited

U.S. PATENT DOCUMENTS

| | | | |
|---|---|---|---|
| 5,694,163 A | 12/1997 | Harrison | |
| 5,724,424 A | 3/1998 | Gifford | |
| 5,805,974 A | 9/1998 | Hite et al. | |
| 5,886,733 A * | 3/1999 | Zdepski | H04N 7/173 348/423.1 |
| 5,897,623 A | 4/1999 | Fein et al. | |
| 5,929,849 A | 7/1999 | Kikinis | |
| 5,990,972 A | 11/1999 | Bond-Harris et al. | |
| 6,005,490 A | 12/1999 | Higashihara | |
| 6,029,645 A | 2/2000 | Wonisch et al. | |
| 6,075,527 A | 6/2000 | Ichihashi et al. | |
| 6,100,925 A | 8/2000 | Rosser et al. | |
| 6,166,739 A * | 12/2000 | Hugh | G06F 17/30873 707/E17.111 |
| 6,177,931 B1 | 1/2001 | Alexander et al. | |
| 6,184,937 B1 | 2/2001 | Williams et al. | |
| 6,198,509 B1 | 3/2001 | Dougherty et al. | |
| 6,208,799 B1 | 3/2001 | Marsh et al. | |
| 6,240,555 B1 * | 5/2001 | Shoff | H04N 5/44543 348/E5.104 |
| 6,275,648 B1 | 8/2001 | Knudson | |
| 6,282,713 B1 * | 8/2001 | Kitsukawa | G06Q 30/02 348/E5.105 |
| 6,292,624 B1 * | 9/2001 | Saib | H04N 5/44543 348/14.01 |
| 6,381,362 B1 | 4/2002 | Deshpande et al. | |
| 6,460,180 B1 * | 10/2002 | Park | H04N 7/0884 348/E5.002 |
| 6,473,903 B2 | 10/2002 | Balakrishnan et al. | |
| 6,502,241 B1 | 12/2002 | Kretz | |
| 6,545,596 B1 | 4/2003 | Moon | |
| 6,557,171 B1 * | 4/2003 | Sonoda | H04H 20/93 348/E5.108 |
| 6,606,746 B1 * | 8/2003 | Zdepski | G06T 9/007 375/240.26 |
| 6,901,385 B2 * | 5/2005 | Okamoto | G06F 21/10 705/50 |
| 6,973,669 B2 | 12/2005 | Daniels | |
| 7,076,467 B1 * | 7/2006 | Chatani | G06Q 20/127 705/52 |
| 7,127,735 B1 * | 10/2006 | Lee | H04N 7/17336 348/E7.073 |
| 7,212,249 B1 * | 5/2007 | Casement | H04N 5/44543 348/563 |
| 7,263,711 B1 * | 8/2007 | Estipona | H04N 7/163 348/E7.061 |
| 7,313,808 B1 * | 12/2007 | Gupta | G11B 27/034 348/E7.061 |
| 7,379,655 B1 * | 5/2008 | Koyabu | H04N 5/44543 348/E5.105 |
| 7,620,965 B2 * | 11/2009 | Miyazaki | H04N 7/17318 386/249 |
| 7,849,226 B2 * | 12/2010 | Zigmond | H04N 5/4401 701/1 |
| 7,996,873 B1 * | 8/2011 | Nathan | G11B 27/002 725/100 |
| 8,479,238 B2 * | 7/2013 | Chen | G06F 17/30017 725/86 |
| 8,516,520 B1 * | 8/2013 | Look | G11B 27/034 725/39 |
| 8,667,553 B2 | 3/2014 | Zdepski | |
| 8,689,259 B2 * | 4/2014 | Yuen | H04N 21/4332 725/36 |
| 9,118,958 B2 * | 8/2015 | Reichardt | G06Q 30/0241 |
| 9,438,958 B2 | 9/2016 | Zdepski | |
| 2002/0052782 A1 * | 5/2002 | Landesmann | G06Q 20/20 705/14.2 |
| 2002/0059588 A1 * | 5/2002 | Huber | G07C 9/00158 725/35 |
| 2002/0059629 A1 | 5/2002 | Markel | |
| 2002/0083091 A1 * | 6/2002 | Pulier | G06F 17/30905 715/203 |
| 2002/0194620 A1 | 12/2002 | Zdepski | |
| 2003/0046690 A1 * | 3/2003 | Miller | H04H 20/10 725/36 |
| 2003/0126621 A1 * | 7/2003 | Leak | H04N 7/088 725/135 |
| 2003/0204854 A1 * | 10/2003 | Blackketter | H04N 7/088 725/113 |
| 2004/0205810 A1 * | 10/2004 | Matheny | G06Q 30/0226 725/23 |
| 2005/0086703 A1 * | 4/2005 | Gupta | G06F 17/241 725/135 |
| 2005/0160457 A1 * | 7/2005 | Rui | G06F 17/30743 725/45 |
| 2006/0271980 A1 * | 11/2006 | Mankovitz | H04N 5/765 725/90 |
| 2014/0181875 A1 | 6/2014 | Zdepski | |

FOREIGN PATENT DOCUMENTS

| | | |
|---|---|---|
| DE | 1397913 A1 | 3/2004 |
| EP | 0445715 A2 | 9/1991 |
| EP | 0830019 A2 | 3/1998 |
| EP | 0837599 A2 | 4/1998 |
| EP | 1397913 A1 | 3/2004 |
| FR | 1397913 A1 | 3/2004 |
| GB | 1397913 A1 | 3/2004 |
| IT | 1397913 A1 | 3/2004 |
| WO | WO-2002104013 A1 | 12/2002 |

OTHER PUBLICATIONS

U.S. Appl. No. 14/195,249, filed Mar. 3, 2015, Automated Input in an Interactive Television System, U.S. Pat. No. 9,438,958.
"U.S. Appl. No. 09/885,793, Advisory Action dated Jun. 15, 2006", 3 pgs.
"U.S. Appl. No. 09/885,793, Appeal Brief filed Mar. 2, 2009", 33 pgs.
"U.S. Appl. No. 09/885,793, Corrected Notice of Allowance dated Sep. 19, 2013", 6 pgs.
"U.S. Appl. No. 09/885,793, Decison on Appeal Brief Request dated Jan. 30, 2009", 2 pgs.
"U.S. Appl. No. 09/885,793, Decison on Appeal dated Nov. 1, 2012", 8 pgs.
"U.S. Appl. No. 09/885,793, Examiner's Answer dated Jun. 11, 2009", 16 pgs.
"U.S. Appl. No. 09/885,793, Final Office Action dated Jun. 18, 2007", 12 pgs.
"U.S. Appl. No. 09/885,793, Final Office Action dated Sep. 3, 2008", 14 pgs.
"U.S. Appl. No. 09/885,793, Final Office Action dated Dec. 28, 2005", 10 pgs.
"U.S. Appl. No. 09/885,793, Non Final Action dated Sep. 25, 2006", 12 pgs.
"U.S. Appl. No. 09/885,793, Non Final Office Action dated Jan. 22, 2013", 14 pgs.

(56) References Cited

OTHER PUBLICATIONS

"U.S. Appl. No. 09/885,793, Non Final Office Action dated Feb. 8, 2008", 14 pgs.

"U.S. Appl. No. 09/885,793, Non Final Office Action dated Jul. 1, 2005", 10 pgs.

"U.S. Appl. No. 09/885,793, Notice of Allowance dated Jul. 8, 2013", 10 pgs.

"U.S. Appl. No. 09/885,793, Reply Brief filed Aug. 11, 2009", 9 pgs.

"U.S. Appl. No. 09/885,793, Response filed Mar. 26, 2007 to Non Final Action dated Sep. 25, 2006", 15 pgs.

"U.S. Appl. No. 09/885,793, Response filed Mar. 28, 2006 to Final Office Action dated Dec. 28, 2005", 15 pgs.

"U.S. Appl. No. 09/885,793, Reponse filed May 1, 2013, to Non Final Office Action dated Jan. 22, 2013", 20 pgs.

"U.S. Appl. No. 09/885,793, Response filed May 8, 2008 to Non Final Office Action dated Feb. 8, 2008", 25 pgs.

"U.S. Appl. No. 09/885,793, Response filed Jun. 28, 2006 to Advisory Action dated Jun. 15, 2006", 17 pgs.

"U.S. Appl. No. 09/885,793, Response filed Sep. 30, 2005 to Non Final Office Action dated Jul. 1, 2005", 16 pgs.

"U.S. Appl. No. 09/885,793, Response filed Nov. 19, 2007 to Final Office Action dated Jun. 18, 2007", 19 pgs.

"U.S. Appl. No. 14/195,249, Final Office Action dated Jul. 31, 2015", 6 pgs.

"U.S. Appl. No. 14/195,249, Non Final Office Action dated Nov. 7, 2014", 8 pgs.

"U.S. Appl. No. 14/195,249, Notice of Allowance dated Apr. 12, 2016", 8 pgs.

"U.S. Appl. No. 14/195,249, Response filed Feb. 1, 2016 to Final Office Action dated Jul. 31, 2015", 8 pgs.

"U.S. Appl. No. 14/195,249, Response filed May 7, 2015 to Non Final Office Action dated Nov. 7, 2014", 9 pgs.

"Deutsche Bundespost Telekom, instruction manual of the device MultiTel T", (Jun. 1993), 35-43 and 54.

"European Application Serial No. 02742091.8, Minutes of Oral Proceeding dated Jun. 21, 2007", 12 pgs.

"European Application Serial No. 02742091.8, Notice of Opposition dated Dec. 9, 2005", 10 pgs.

"European Application Serial No. 02742091.8, Office Action dated Feb. 21, 2008", 1 pg.

"European Application Serial No. 02742091.8, Office Action dated Feb. 29, 2008", 2 pgs.

"European Application Serial No. 02742091.8, Office Action dated May 23, 2008", 20 pgs.

"European Application Serial No. 02742091.8, Office Action dated May 29, 2008", 2 pgs.

"European Application Serial No. 02742091.8, Office Action dated Sep. 22, 2004", 30 pgs.

"European Application Serial No. 02742091.8, Office Action dated Nov. 12, 2007", 17 pgs.

"European Application Serial No. 02742091.8, Response filed May 24, 2006 to Notice of Opposition dated Dec. 9, 2005", 9 pgs.

"European Application Serial No. 02742091.8, Response filed Aug. 20, 2007", 6 pgs.

"European Application Serial No. 02742091.8, Summons to Attend Oral Proceedings dated Jul. 11, 2006", 7 pgs.

"European Application Serial No. 02742091.8, Withdrawal of Request for Oral Proceedings filed May 22, 2007", 1 pg.

"European Application Serial No. 02742091.8, Written Submissions for Oral Proceedings filed Apr. 24, 2007", 43 pgs.

"International Application Serial No. PCT/US2002/018931, International Preliminary Examination Report dated May 23, 2003", 16 pgs.

"International Application Serial No. PCT/US2002/018931, International Search Report dated Jun. 9, 2002", 3 pgs.

"International Application Serial No. PCT/US2002/018931, International Search Report dated Sep. 16, 2002", 3 pgs.

"International Application Serial No. PCT/US2002/018931, Response filed Apr. 24, 2003 to Written Opinion dated Jan. 24, 2003", 18 pgs.

"International Application Serial No. PCT/US2002/018931, Written Opinion dated Jan. 24, 2003", 6 pgs.

\* cited by examiner

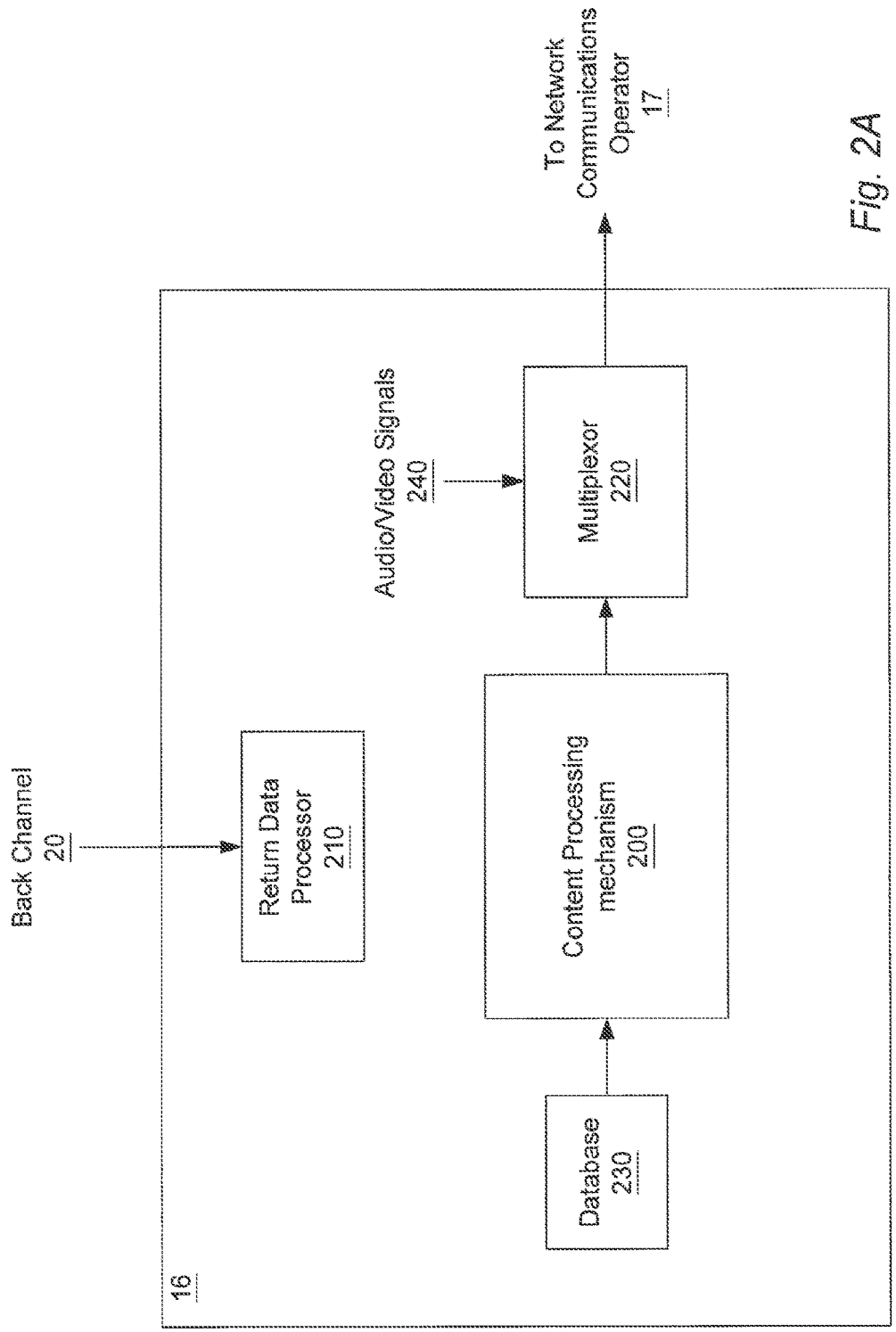

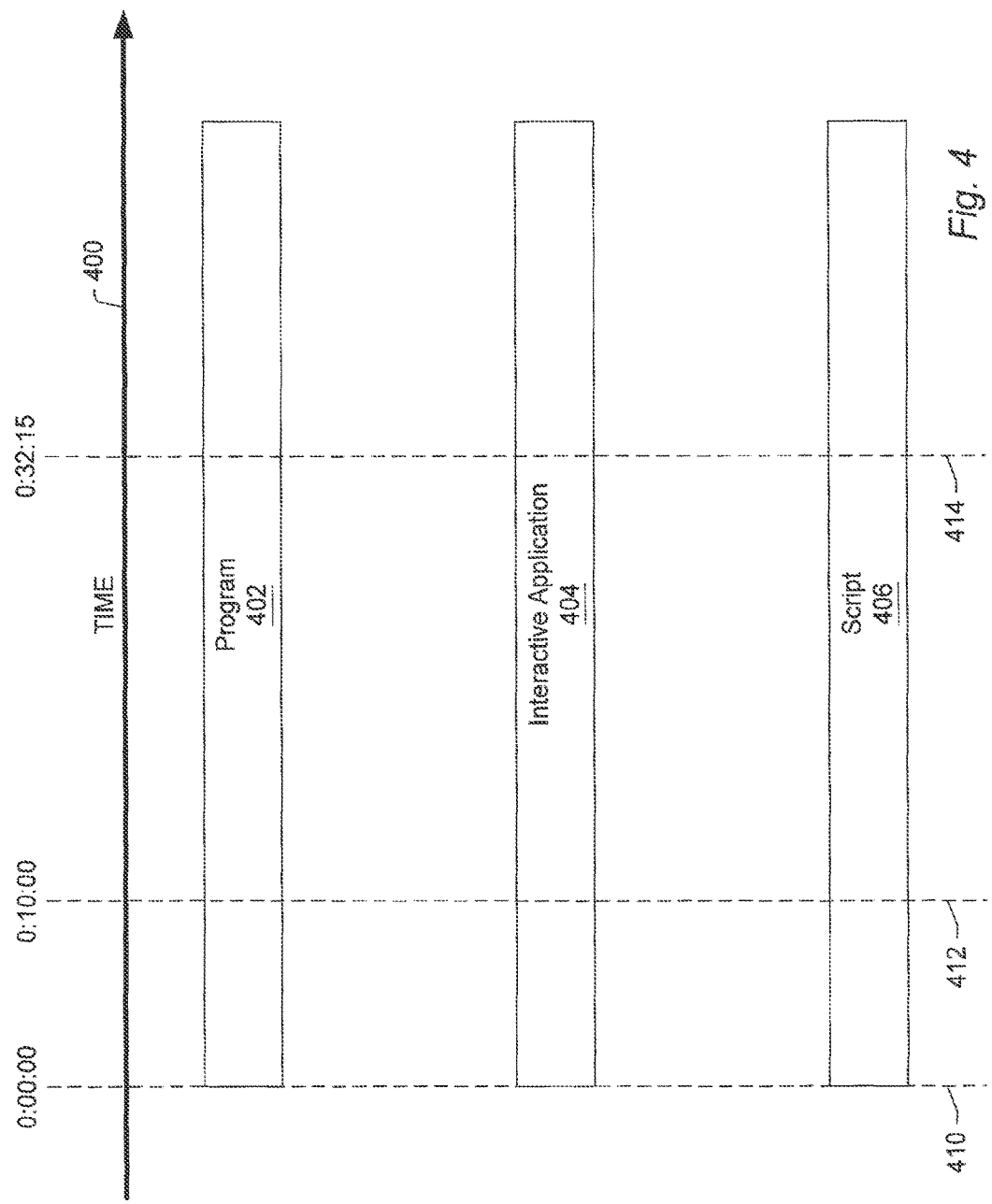

|  | 7:00 - 7:30 | 7:30 - 8:00 | 8:00 - 8:30 | 8:30 - 9:00 | 9:00 - 9:30 |
|---|---|---|---|---|---|
| NBC | Weakest Tie | | Movie of the Week - "The Judge" | | |
| ABC | Air Force One (Repeat) (R) | | | | News |
| CBS | Queen of Kings | No, Dear | Some People Like Raymond | Magician's Best Secrets Not Revealed | |
| FOX | Boston Private | | Ally McDeal's Big Adventure | | News |
| CNN | Rolf Klitzer | Point Counter-Point | Harry King Live | | The Spin Foyer |

*Fig. 5A*

Time 8:24am      Date Monday, May 7, 2001

Selection: Title: Magician's Best Secrets Not Revealed
Channel: CBS
Date: Monday, May 7, 2001
Time: 8:30pm - 9:30pm

Options:
- 570A ☐ PVR
- 570B ☐ VCR
  - 570C ☐ VCR - ITV
- 570D ☐ Autotune
- 570E ☐ PopUp Reminder

*Fig. 5B*

AUTOMATED INPUT IN AN INTERACTIVE TELEVISION SYSTEM

RELATED APPLICATIONS

This application is a continuation of U.S. patent application Ser. No. 14/195,249, filed Mar. 3, 2014, which is a continuation of U.S. patent application Ser. No. 09/885,793, filed Jun. 19, 2001 and issued on Mar. 4, 2014 as U.S. Pat. No. 8,667,553, which applications are incorporated herein by reference in their entirety.

BACKGROUND OF THE INVENTION

Field of the Invention

The invention relates generally to interactive television systems and more particularly to a system and method for automating user input in an interactive television system.

Description of Related Art

Interactive television systems provide a means to deliver interactive content as well as ordinary television audio and video to a large number of subscribers. Programs broadcast by these systems may incorporate television audio and video, still images, text, interactive graphics and applications, and many other components. The interactive content of the interactive television signal may therefore include application code, data associated with the audio and video, control signals, raw data and many other types of information. Both the interactive content and the audio and video data are delivered to subscribers as "pushed" data. That is, the data is delivered to each of the subscribers, regardless of whether or not the subscribers requested the data.

The interactive functionality of the television is generally controlled by a set-top box connected to the television. The set-top box receives the signal transmitted by a broadcast service provider, separates the interactive portion from the audio-video portion and decompresses the respective portions of the signal. The set-top box uses the interactive information to, for example, execute an application while the audio-video information is transmitted to the television. The set-top box may combine the audio-video information with interactive graphics or audio generated by the interactive application prior to transmitting the information to the television. The interactive graphics and audio may present additional information to the viewer or may prompt the viewer for input. The set-top box may provide viewer input or other information to the broadcast service provider via a modem connection.

Interactive content such as application code or information relating to television programs is usually broadcast in a repeating format. In other words, each piece of information is broadcast a first time, then each is transmitted a second time, and so on. The cycle is repeated so that each piece of interactive data is transmitted, for example, every ten seconds. The pieces of information which are broadcast in this manner form what is referred to as a "carousel." Frequently, a single carousel is transported as a contiguous data stream. However, it is also possible to multiplex two or more carousels in a single data stream.

Broadcast systems (e.g., interactive television systems) transmit information in a carousel format in order to allow receivers in the system to selectively obtain particular pieces of information in the carousel without requiring a return path from the receivers to the server. If a particular receiver needs a particular piece of information, it can simply wait until next time that piece of information is broadcast, and then extract the information from the broadcast data stream. Other receivers in the system can operate in the same manner, each receiver waiting for the information it needs, and then using only that information. By employing carousels to broadcast information, the system eliminates the need to connect each of the receivers with the server and further eliminates the need for the server to process individual requests for information. Generally, a broadcast signal may include a number of programs which in turn may include a number of audio/video streams and/or data streams. Data streams may be used to carry data such as interactive application data, subtitle information, or other data.

The pieces of information, or data objects, in a carousel may be intended to be combined in a single object data stream to form a program. This program may also contain streaming data such as audio or video. For example, an interactive television game show may combine television audio and video with interactive content such as application code which allows users to answer questions. Another example would be a news program which combines audio and video with application code that inserts current stock prices in a banner at the bottom of the screen. (It should be noted that many types of programs are possible, and it is not necessary to include either audio, video or interactive content any particular program. A program might contain only audio and interactive data (e.g., an interactive radio program,) or it might contain only interactive data (e.g., an interactive weather program that does not contain audio or video streams.) Typically, each program is associated with a corresponding channel and, when a channel containing a particular program is selected by the interactive television receiver, the data which is being broadcast on that channel is downloaded and the program is started.

One of the advantages of interactive television involves using interactive content to enhance the content of a particular broadcast program. For example, during the broadcast of a sporting event such as a baseball game additional content may be transmitted to the viewer in order to enhance their viewing experience. In one example, numerous statistics related to the ongoing baseball game may be included as interactive content. To indicate to the viewer such added content is available, an icon or menu may be displayed on the television with which the viewer may interact. If the viewer desires to view the additional content, the icon is selected or a menu item is selected which then display the additional content. In this manner, only those viewers who wish to view the additional content will see it displayed on their screen. Viewers who do not wish to view the additional content will not have their view of the program obstructed or altered in any way.

While the availability of additional interactive content is highly desirable, such systems as described above require a viewer to interact with the application providing the content in order to view the additional content. In some cases this interaction may involve traversing a number of menu items in order to reach the desired content. Further, in some instances a viewer may wish to always view particular added content while watching a particular show. Unfortunately, requiring the viewer to interact with the interactive application during viewing in order to access the desired content can interfere with the enjoyment of the viewer's experience.

Another problem that arises in the context of interactive television reveals itself when a viewer records a program for later viewing. Under ordinary circumstances, if a viewer wishes to record a program for later viewing, the viewer configures a VCR or other recording device to begin programming a particular program at a particular time. However, in the case of a program that includes added content which is accessed via viewer interaction, the added content will not be recorded. Only that image which is broadcast by the broadcaster will be recorded. Consequently, even though a viewer may desire to see the added content when viewing the recorded program, the added content will be unrecorded and unavailable. Consequently, a method and mechanism for allowing a viewer to access added interactive content without requiring interaction on the viewer's part is desired.

SUMMARY OF THE INVENTION

The problems outlined above may be solved by various embodiments of the invention described herein. One embodiment is a method of using a script in an interactive television system. An interactive application corresponding to a broadcast program is executed in a receiver. The interactive application is configured to provide added content upon request. A script executing within the receiver provides input to the interactive application in lieu of a viewer actively providing that input. Upon detecting the input conveyed by the script, the interactive application provides the added content as if the viewer had actively requested its display.

In one embodiment, the above described script directly corresponds to a particular interactive application and may be conveyed to the receiver along with the interactive application. Alternatively, a receiver may be configured so that a viewer may indicate default preferences concerning the use of scripts. In such an embodiment, a standardized script may be created which provides input to interactive application in a predetermined manner. These standardized scripts may also be conveyed along with an interactive application or may be created dynamically within a viewer's receiver.

BRIEF DESCRIPTION OF THE DRAWINGS

Other objects and advantages of the invention will become apparent upon reading the following detailed description and upon reference to the accompanying drawings in which:

FIG. 2A is a diagram of one embodiment of a head-end.

FIG. 4 is an illustration of a scripting mechanism.

FIG. 5A is an illustration of an interactive television display.

FIG. 5B is an illustration of an interactive television display.

Figure 1:
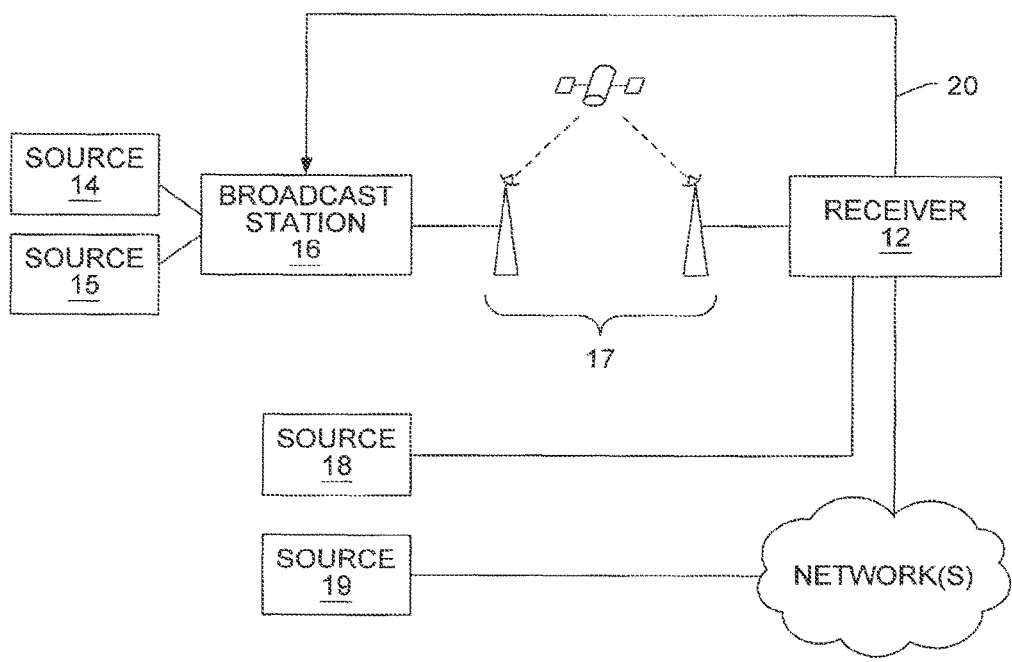
FIG. 1 is a diagram of one embodiment of an interactive television system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Overview

Referring to FIG. 1, a functional block diagram illustrating the distribution of interactive television content from a variety of sources to receiving device is shown. In the embodiment shown, a receiving device 12 is coupled to several sources of interactive television content. Receiving device 12 may include any number of suitable devices, examples of such devices include a set-top box (STB), a television (TV), a personal video recorder (PVR), a personal digital assistant (PDA), a personal computer (PC), a video game console, or a mobile/cell phone. While the content may be delivered through many different delivery mechanisms, three exemplary mechanisms are shown in the figure.

In one embodiment, content is conveyed from a source 14 to broadcast station 16. In one embodiment, the content may also be created at source 14 which may include an authoring station configured to create such content. An authoring station may include a computer workstation configured with software which aids in the development of interactive content for conveyance to a broadcast station 16. Authoring station 14 may be directly coupled to broadcast station 16 in which case the conveyance of the created content may be through a local computing network, or similar configuration. Alternatively, authoring station 14 may be remotely located from broadcast station 16. In an embodiment where authoring station is not directly coupled to broadcast station 16, the created content may be conveyed via broadcast, cable, etc. In some cases, content created by authoring station 14 may first be transferred to a storage medium, such as a CD-ROM or DVD-ROM, and transported to broadcast station 16 via more conventional means where it may be stored in a database or other storage device.

Subsequent to its creation, content from sources 14 and 15 may be delivered to receiver 12 through a broadcast transmission network. This network consists essentially of a broadcast station 16 which assembles the content from sources 14 and 15 and processes (e.g., digitizes, compresses and packetizes) the content, and a satellite transmission network 17 which receives the content from broadcast station 16 and transmits it to receiving device 12. (It should be noted that receiving device 12 may be only one of many devices to which this content is distributed.) In one embodiment, broadcast station 16 includes software and/or hardware which is configured to process the content conveyed by source 14 and source 15 as described above. The second delivery mechanism is a direct point-to-point connection between receiver 12 and source of 18, which may be some type of server. This connection may be made via an ordinary telephone line. The third delivery mechanism is also a point-to-point connection, but transmission of the content from source 19 to receiver 12 is made via one or more shared networks (e.g., over the Internet.) Also illustrated in FIG. 1 is a back channel (or return path) 20 by which receiver 12 may convey data to broadcast station 16. Back channel 20 may comprise a telephone line, cable, wireless, or other connection.

One delivery mechanism, the direct point-to-point connection to a source of content, may comprise communication via an ordinary telephone line. This type of connection is typically initiated by the receiver to retrieve information from a data server. Another delivery mechanism, the point-to-point connection through one or more networks, may comprise a typical connection between nodes on the Internet. Because data may be routed through many different shared networks in this case, it may be read, stored and written many times as it is transmitted from source 19 to receiver 12. The third delivery mechanism is a satellite broadcast network. This network may, in one embodiment, comprise a vertical pay TV network. On the other hand, the satellite broadcast network may comprise a horizontal "free to air" television network.

Turning now to FIG. 2A, an overview of one embodiment of a broadcast station (head-end) 16 is shown. The broadcast station 16 of FIG. 2A, includes a database 230 which contains previously created interactive content. As discussed above, a source 14 of interactive content may be external to broadcast station 16 and may be conveyed to broadcast station 16. Database 230 is coupled to a content processing mechanism 200 which is configured to process the content received from database 230 and convey the processed content. In one embodiment, content processing mechanism 200 may comprise a server computer and may also be coupled to receive and convey content from the Internet or World Wide Web. Processing mechanism 200 is configured to convey the processed content to multiplexor 220. Multiplexor 220 is also coupled to receive audio/video signals 240. Multiplexor 220 multiplexes the received signals and conveys the multiplexed signal to network communications operator 17 where it is subsequently conveyed to a receiving device. Finally, broadcast station 16 includes a return data processor 210 coupled to back channe 120. In one embodiment, return data processor 210 may comprise a modem which receives data for further processing within broadcast station 16. While the above description describes a source of interactive content as being at a broadcast station 16, in an alternative embodiment database 230 and content processing mechanism 200 may reside at the location of a network communications operator 17. An example of such an alternative embodiment may be a cable station which inserts interactive content into a broadcast signal prior to transmission.

Figure 2B:
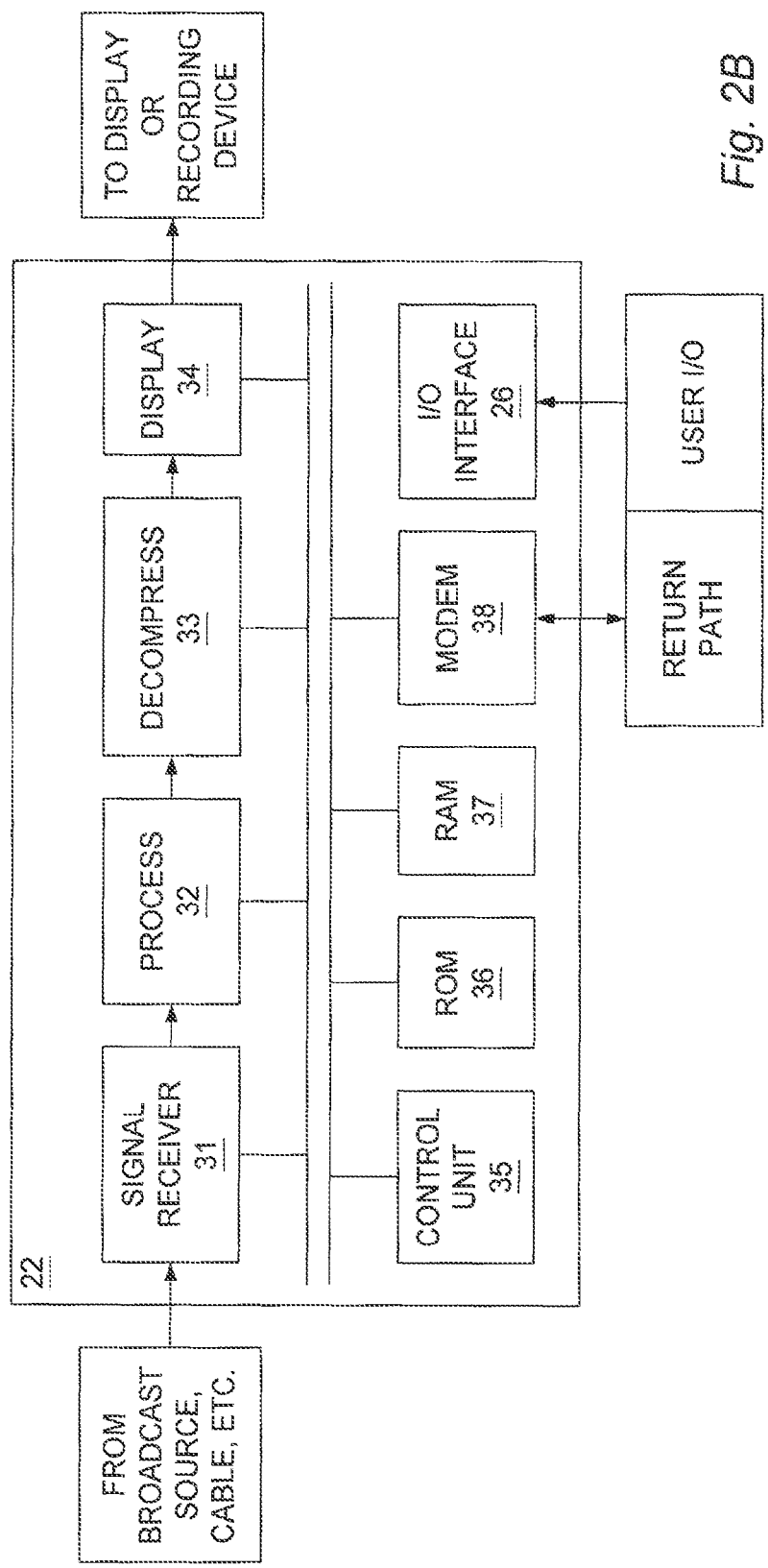
FIG. 2B is a diagram of one embodiment of a receiver.

Referring to FIG. 2B, a block diagram of a receiver 22 is shown. In one embodiment, receiver 22 is implemented in a set-top box for a television. In other embodiments, the receiver may be incorporated into the circuitry of other components of a receiving station, such as the television which is coupled to the receiver, or one of the devices 12 described above. Interactive television content is delivered to receiver 22 through a signal receiver such as tuner 31. In this embodiment, a broadcast signal is fed into tuner 31. Tuner 31 selects a channel on which broadcast interactive content is transmitted and passes the content to processing unit 32. (It should be noted that interactive television content may also be delivered to receiver 22 through other signal receivers, such as modem 38.) The interactive television signal may contain information in addition to the television programming. For example, interactive application modules or control signals may be embedded in the broadcast signal. Alternative embodiments of receiver 22 may include, or be coupled to, a mass storage device such as a hard disk drive.

In the case of a digital satellite transmission, the content is formatted into packets, so processing unit 32 demultiplexes packets from the broadcast signal, and reconstructs the packets into what is typically a compressed television program and/or interactive application embodied in the received content. The decompression is performed by decompression unit 33. The audio and video information associated with television program embodied in the signal is then conveyed to display unit 34, which may perform further processing and conversion of the information into a suitable television format, such as NTSC or HDTV audio/video. Applications reconstructed from the broadcast signal are routed to random access memory (RAM) 37 and are executed by control unit 35. The user can interact with the applications or other interactive content through I/O devices coupled to I/O interface 26. I/O interface 26 is configured to receive input from a viewer. For example, a viewer may utilize an infrared remote control which is detected by interactive receiving unit 26. Alternatively, a viewer may utilize input devices such as a mouse, writing tablet, voice, or other device which is detected by interactive receiving unit 26. Many other possible viewer input devices are possible and are contemplated. (It should be noted that the foregoing description of the functionality of the interactive television system is only an example of such a system, and is not intended to be limiting.)

Control unit 35 may comprise a microprocessor, microcontroller, digital signal processor (DSP), or some other type of instruction processing device. Memory 36 may include memory units which are static (e.g., SRAM), dynamic (e.g., DRAM), volatile or non-volatile (e.g., FLASH), as required to support the functions of the receiver. System code is typically stored in FLASH memory. When power is applied to the receiver, control unit 35 executes operating system code which is stored in memory 36. The operating system code executes continuously while the receiver is powered in the same manner the operating system code of a typical personal computer (PC) and enables the receiver to execute control information and application code.

In one embodiment, a viewer uses a remote control to provide input to receiver 22. I/O interface 26 detects input provided by a viewer. Input received from a viewer via I/O interface 26 may then be stored in a message queue for processing by control unit 35. For example, receiver 22 may execute an interactive application which is configured to process commands and other input by a viewer by accessing a particular address region in RAM 37. In such a configuration, a message queue for storing viewer input may be located at that particular address region. Alternatively, an interactive application may be configured to detect and receive input via the operating system code. Numerous alternative configuration for conveying viewer input to an interactive application are possible and are contemplated.

The receiver is typically housed in a set-top box connected to a user's television. It should be noted that the receiver may comprise any processing unit for receiving and processing the interactive television content. The receiver may be in a set-top box housing which physically sits on top of a television, it may be in some other location external to the television (e.g., on the side or back of the television or remotely located from the television), or it may be incorporated into the television itself. Similarly, the television to which the output of the receiver is directed may comprise a television or a video monitor employing any suitable television format (e.g., NTSC or HDTV), or it may be replaced by other devices, such as a recording device.

Interactive Content

Figure 3A:
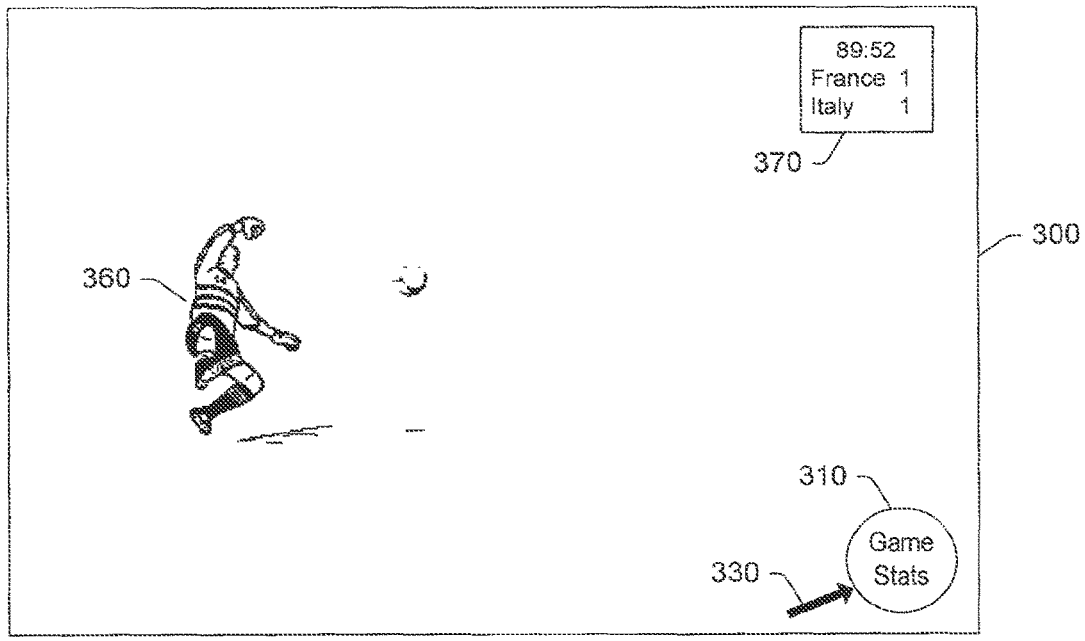
FIG. 3A is an illustration of an interactive television display.
Figure 3B:
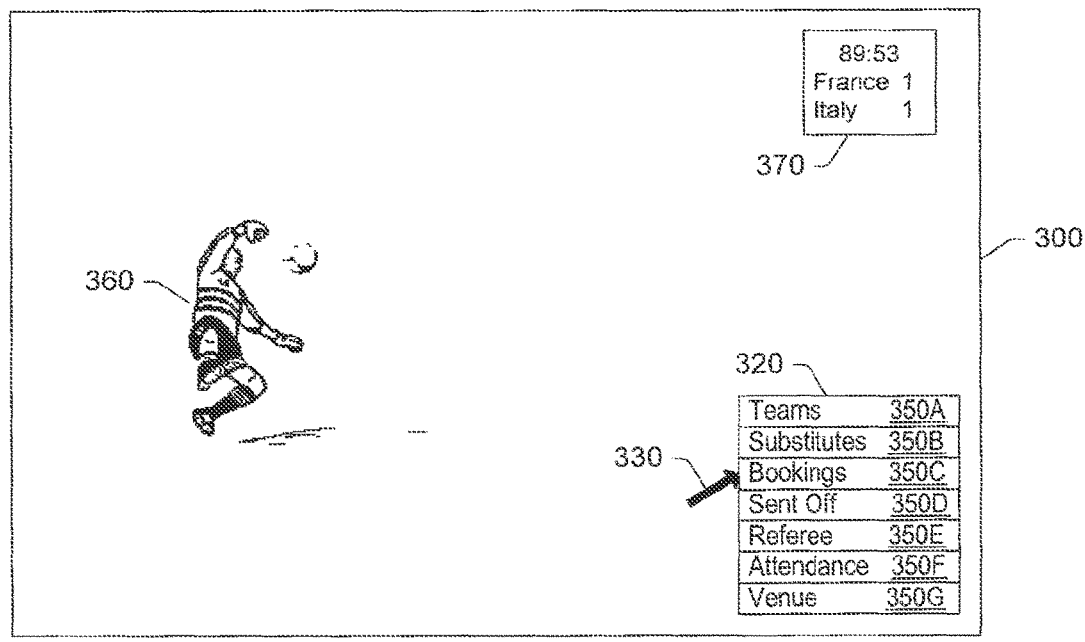
FIG. 3B is an illustration of an interactive television display.

Turning now to FIGS. 3A and 3B, an exemplary illustration of an interactive application providing an opportunity for the display of added content is shown. FIG. 3A shows a television display 300 which is displaying a program in which interactive added content is available. Included in FIG. 3A are non-interactive content 360 and 370 which may appear in interactive and non-interactive systems. Also included are interactive content 330 and 310 which may appear in interactive systems. In the example shown, icon 310 indicates there is interactive added content available with the displayed program. Arrow 330 illustrates one method a viewer may use to select interactive content on the display 300. Rather than utilizing an arrow 330, other embodiments may simply highlight selected areas of the screen to indicate the currently selected object. In the example shown, arrow 330 corresponds to a remote control device operated by the viewer which may be used to move the arrow 330 about the display 300. In one embodiment, a viewer moves the arrow 330 over icon 310 and presses a button on the remote control in order to select icon 310. In this manner, a viewer is able to access the added interactive content.

FIG. 3B illustrates display 300 subsequent to a viewer selecting icon 310. In the example shown, the icon is replaced with a menu 320 of items 350A-350G for selection by the viewer. Elements referred to herein with a particular reference number followed by a letter will be collectively referred to by the reference number alone. For example, menu 320 items 350A-350G will be collectively referred to as menu items 350. A viewer may then utilize the remote control and corresponding arrow 330 to select one of the menu items 350. Selecting one of menu items 350 may then display another menu or may display added content, such as sports statistics or other data. While the above illustrations refers to added content which corresponds to the currently broadcast program, any type of added content may be added. For example, a stock ticker, news headlines, music, a video game, or any other content may be utilized.

Scripts

As previously discussed, a viewer may wish to have the added content displayed without having to actively engage in interaction with the program and associated interactive application. One method for enabling the display of added content involves the use of a script associated with the interactive application. In addition to the television program and interactive application being conveyed to a receiver, a "script" corresponding to the interactive application is created and conveyed to the receiver as well. As used herein, a script may be described as a group of executable commands or instructions.

In the present context, a script may be used to provide input to an interactive application that would otherwise be received via a viewer's active interaction (e.g., by using a remote control). When such a script is created, the creator of the script typically has some knowledge of the content of the corresponding program and interactive application which is being broadcast. For example, the producer of a program may also have software tools which enable the creation of interactive applications. The producer may utilize these tools to create an interactive application which enhances the corresponding program. If the program is a basketball game, for example, the producer may wish to provide constantly updated game statistics and news of other basketball games to those viewers who wish to view such information. By creating the appropriate interactive application, the producer may make this added content available to viewers.

In a typical interactive television broadcast, the above described basketball game and corresponding interactive application supporting the game statistics and news are broadcast to viewers. Viewers wishing to view the added content are then required to utilize a remote control or other device to actively request the display of the added content. To eliminate the need for this active viewer participation, the producer may create a script. In one embodiment, the creator of the script configures the script to provide appropriate input data at the appropriate times. For example, during the broadcast of the basketball game, the corresponding interactive application may be configured to provide the opportunity to view added content at predetermined times. Such an opportunity may be indicated to a viewer by an icon 310 displayed on a television screen or some other appropriate manner. The script is configured to provide input data to be used by the interactive application. In the present example, the script provides input which indicates the added content is to be displayed. At the appropriate time, the interactive application determines if any input corresponding to the added content is present. Finding the input that was provided by the script, the interactive application proceeds to respond accordingly and displays the added content as if the input had been actively provided by a viewer. Advantageously, no active viewer interaction is required in order to access and display the added content. In this embodiment, a script may include a number of commands or actions and the times at which they are to be acted upon.

In one embodiment, a message queue may be utilized to store input received from a viewer via a remote control or other device. An interactive application then retrieves input from the message queue and responds accordingly. In such an embodiment, a script may be used which places data in the message queue for consumption by the interactive application. Because the script is configured to provide input data which may be indistinguishable from active viewer input, such a script may be used with any interactive application which is configured to receive such viewer input. Advantageously, interactive applications need not be modified to take advantage of the benefits provided by scripts.

FIG. 4 is an exemplary diagram illustrating one embodiment of the scripting mechanism described above. FIG. 4 includes a reference timeline 400 illustrating a progression of time, a broadcast program 402, an interactive application 404, and a script 406. Interactive application 404 and script 406 are configured to correspond to the program 402 being broadcast. In this example, program 402, interactive application 404 and script 406 begin conveyance at time 0:00:00 represented by marker 410, though it is not necessary that all three begin at the same time. In one embodiment, interactive application 404 and script 406 are conveyed in a carousel manner as described above. However, any suitable manner of conveyance may be used. Marker 412 at time 0:10:00 indicates a first opportunity for the display of added content corresponding to program 402. Interactive application 404 is configured to make available added content at this time. Interactive application may have already downloaded the added content, may dynamically download added content, may be configured to request transmission of added content, or otherwise. Script 406 412 may then be configured to provide input at or near time 0:10:00 412 for consumption by interactive application 404. Interactive application 404 is configured to retrieve the input provided by script 406 and act accordingly (e.g., by displaying or otherwise providing the available added content). A second time marker 414 at time 0:32:15 provides a second opportunity for the display of added content by interactive application 404 and corresponding input by script 414.

Figure 5:
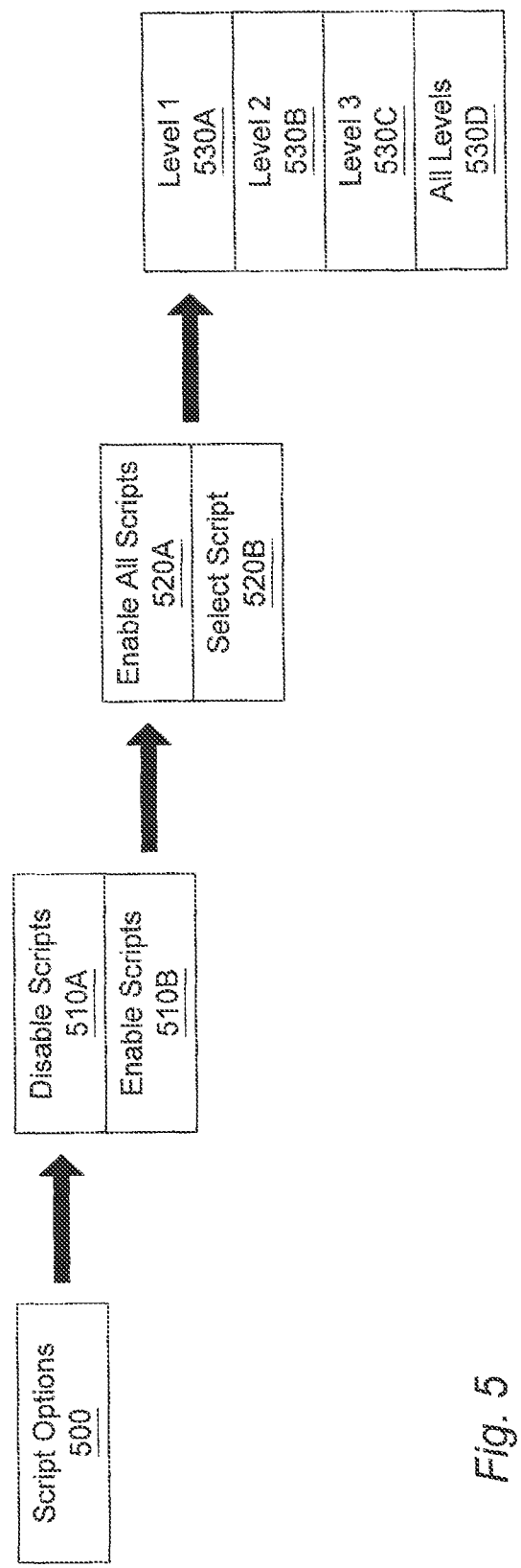
FIG. 5 illustrates one embodiment of a method of indicating script usage preferences.

Various alternatives exist for a viewer to indicate a desire for a script to be run. In addition, the nature of the script created may assume a number of forms as well. FIG. 5 illustrates one embodiment of a method for a viewer to express an intent to run a script. FIG. 5 represents a list of menu items which may be utilized in software executed on receiver 22 for configuring a viewer's preferences. In the embodiment illustrated, a viewer may be presented with a menu option 500 for configuring options related to scripts. Upon selecting this menu item via a remote control or other input device, a new set of options 510 are presented. One option 510A allows a viewer to disable all scripts which may be available for a program or interactive application. Disabling scripts will result in the display of a program without the added content. A second option 510B allows a viewer to access another menu 520 for options related to enablement of scripts. Selecting option 510B results in the display of further options 520. Option 520A allows a viewer to direct that all available scripts are to be run. Option 520B allows a viewer to display further options (not shown) related to enabling particular scripts. In one embodiment, a viewer may identify particular scripts to be run based on a time of broadcast, a code associated with a particular broadcast, or any other suitable means. For example, a viewer may configure a receiver to record a particular program at a later time and indicate that a script corresponding to that program is to be run. Alternatively, while watching a program a viewer may indicate any associated script is to be utilized.

A further selection menu 530 may be provided which allows a viewer to specify a particular level of script execution. In such an embodiment, a script may be configured to access increasing levels of added content which may be provided by an interactive application. For example, given the basketball paradigm used above, an interactive application may include a number of levels of added content, each corresponding to an increasing level of detail or entirely different content. A first level of content may simply include basic game statistics. A second level of content may provide news related to particular basketball players in addition to the game statistics. Still further, a third level of content may include a window in the display which shows the text of a live Internet "chat" of people watching the game. Given such an interactive application, a script may be created which is configured to provide the necessary input to access one or more of these levels of content.

FIGS. 5A and 5B illustrate one embodiment of an interactive television display incorporating the above described scripting mechanism. FIG. 5A illustrates a display 300 showing a television programming grid. The grid includes a column 540 indicating different programming channels and a row 542 indicating different programming time slots. Entries within the grid show television programs which are scheduled for the corresponding time and channel. For example, a program 544 entitled "Magician's Best Secrets Not Revealed" is scheduled for broadcast from 8:30-9:30 on CBS. Utilizing a remote control or other device, a viewer may highlight a particular entry in the grid for information regarding the highlighted program. Further, the viewer may select the highlighted entry by pressing a button, for example. Numerous methods for maneuvering among and selecting entries in a television grid are possible and are contemplated.

FIG. 5B illustrates one embodiment of a display 300 subsequent to a viewer selecting entry 544. Included in the display 300 of FIG. 5B are a section 550 indicating the current selection and a section 560 indicating options which are available for the current selection 550. In the embodiment shown, the selection 550 includes information such as the title of the selected program, the channel on which it is to be broadcast, and the time and date of scheduled broadcast. As shown, five options 570A-570E are available for the current selection 550. Each option 570 in the embodiment shown includes a check box which may be selected by a viewer, thereby allowing a viewer to indicate his or her preferences. A first option 570A allows a viewer to indicate the current selection 550 is to be recorded via a PVR. A second option 570B allows a viewer to indicate the current selection 550 is to be recorded via a VCR. A third option 570C (VCR-ITV) allows a viewer to indicate the current selection is to be recorded via a VCR, with interactive television content (ITV) recorded as well. Selecting option 570C enables the above described scripting mechanism. A fourth option 570D indicates a receiver or other device is to automatically tune to the current selection 550 when it is broadcast. Finally, a fifth selection 570E indicates a PopUp reminder is to be displayed for the current selection 550 when it is broadcast.

It is understood that the above menu structure and check box selection methods are intended to be exemplary only. Any suitable method of gathering preferences may be utilized. Preferences indicated by a viewer may then be stored in a volatile or non-volatile storage of receiver 22 which may later be detected by operating software, an application, or a script executing on receiver 22. Alternatively, preferences of a viewer may be conveyed via a return path, such as back channel 20, for processing or storage at head-end 16. In one embodiment, receiver 22 is configured to ascertain the script use preferences of a viewer upon broadcast of a program. Alternatively, script use preferences may be checked upon download and execution of an interactive application. For example, upon receiving an interactive application, receiver 22 may check a particular region of memory or a file stored on a mass storage device to determine if a user has indicated a desire that a script be utilized. Numerous possibilities exist for when and how a viewer's script use preferences may be determined and are contemplated.

Default and Standard Scripts

While the above examples illustrate the use of scripts which directly correspond to a particular interactive application, alternative embodiments may not require such a correspondence. For example, a standard mechanism may be used in all interactive applications which are configured to receive a standardized form of input for indicating a viewer's preferences regarding script usage. In one such embodiment, interactive applications may be configured to one of four different input commands corresponding to added content. For example, if added content is available, an interactive application may present a viewer the opportunity to select one or more "levels" of display of the added content. The selection of a particular level of display may utilize a particular command that is common to all such opportunities presented by all interactive applications configured for such input. In such an embodiment, a viewer may wish to display a minimum level (for example "level 1") of added content in all cases where added content exists. Consequently, a default "level 1" script may be utilized which provides input corresponding to a "level 1" viewer selection to all interactive applications. Advantageously, the creation of scripts may be simplified.

The above described default script functionality may be incorporated into the operating system software of receiver 22, may be downloaded to a receiver 22 as an application, may be created dynamically by the operating system software, or otherwise. In this embodiment, it may no longer be necessary to create scripts which are specific to a particular interactive application or program. Instead, receiver 22 may be configured to detect a default user preference for script usage, detect when an interactive application makes such an opportunity to view added content available, and supply the corresponding input at the appropriate time. Alternatively, if a viewer indicates a default preference for a same level of added content in all cases, receiver 22 may be configured to store an appropriate input in a message queue in a repeated manner. For example, the input may be stored in the queue periodically, or the receiver 22 may be configured to detect when the message queue is low or empty and replenish the message queue with the appropriate input. When an interactive application makes added content available, it checks the message queue and finds the appropriate input indicating added content is to be displayed. In this alternative embodiment, it may not be necessary for receiver 22 to detect when an interactive application makes added content available. Advantageously, the configuration of receiver 22 may be simplified.

Figure 6:
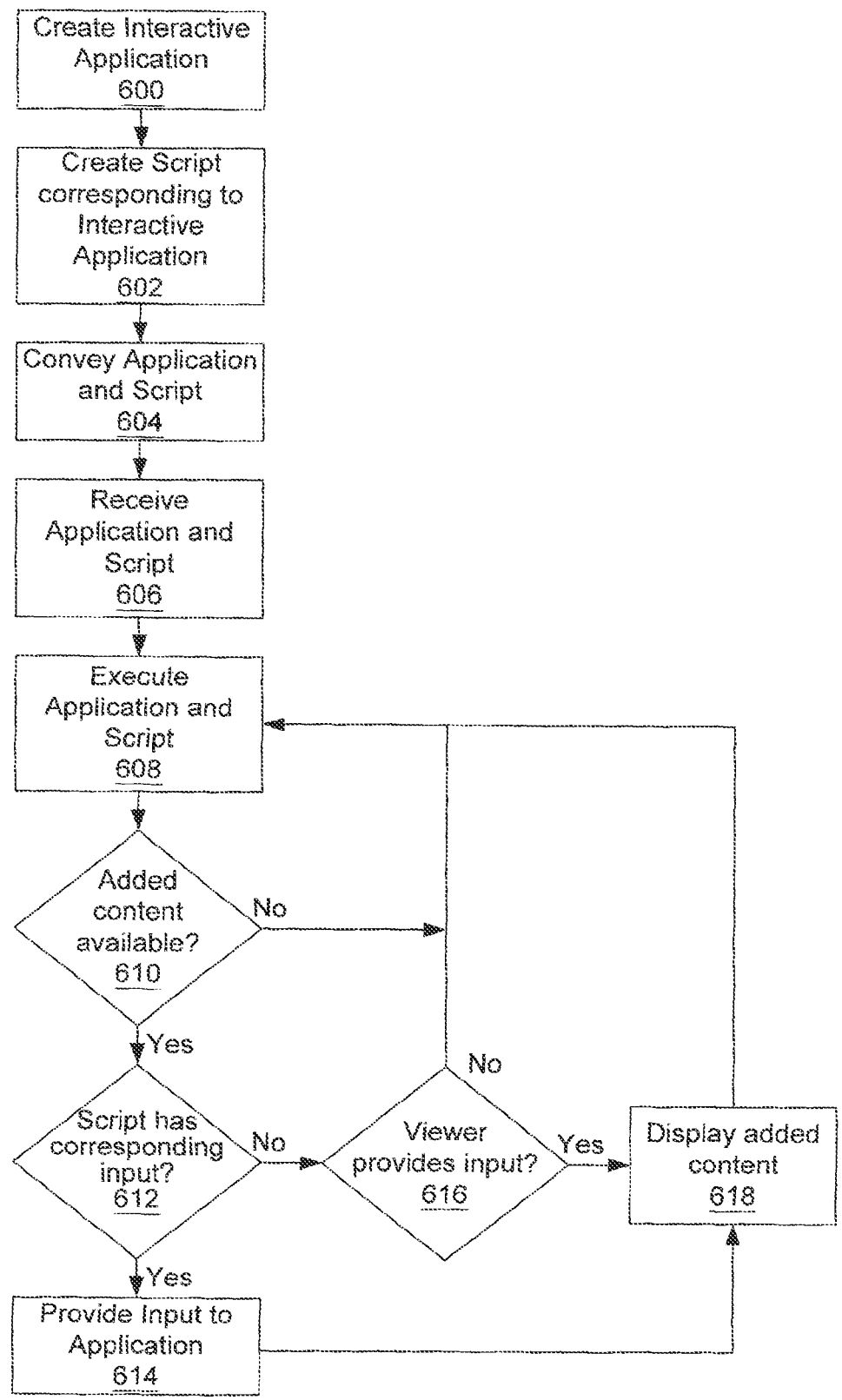
FIG. 6 is a diagram illustrating one method of script usage.

Turning now to FIG. 6, one embodiment of a method for script usage is illustrated. Initially, an interactive application is created 600. Within the interactive application may be opportunities for the display of added content corresponding to a program. In addition, a script is created 602 which corresponds to the created interactive application. The script is configured to provide input for use by the interactive application at those times when the interactive application makes added content available for display. The application and script are then conveyed 604 to a receiver where they are received 606. When the interactive application and script have been received they are executed 608. During execution, added content is made available 610 at a particular time. If script usage is enabled and the script which was received has input at that time 612, the script makes the corresponding input available to the application 614 and the added content is displayed 618. If the script does not have input available 612, but a viewer actively provides input 616, the added content is displayed 618. If neither the script 612 nor a viewer 616 provides input, execution of the application and script continues 608 without displaying the added content.

Figure 6A:
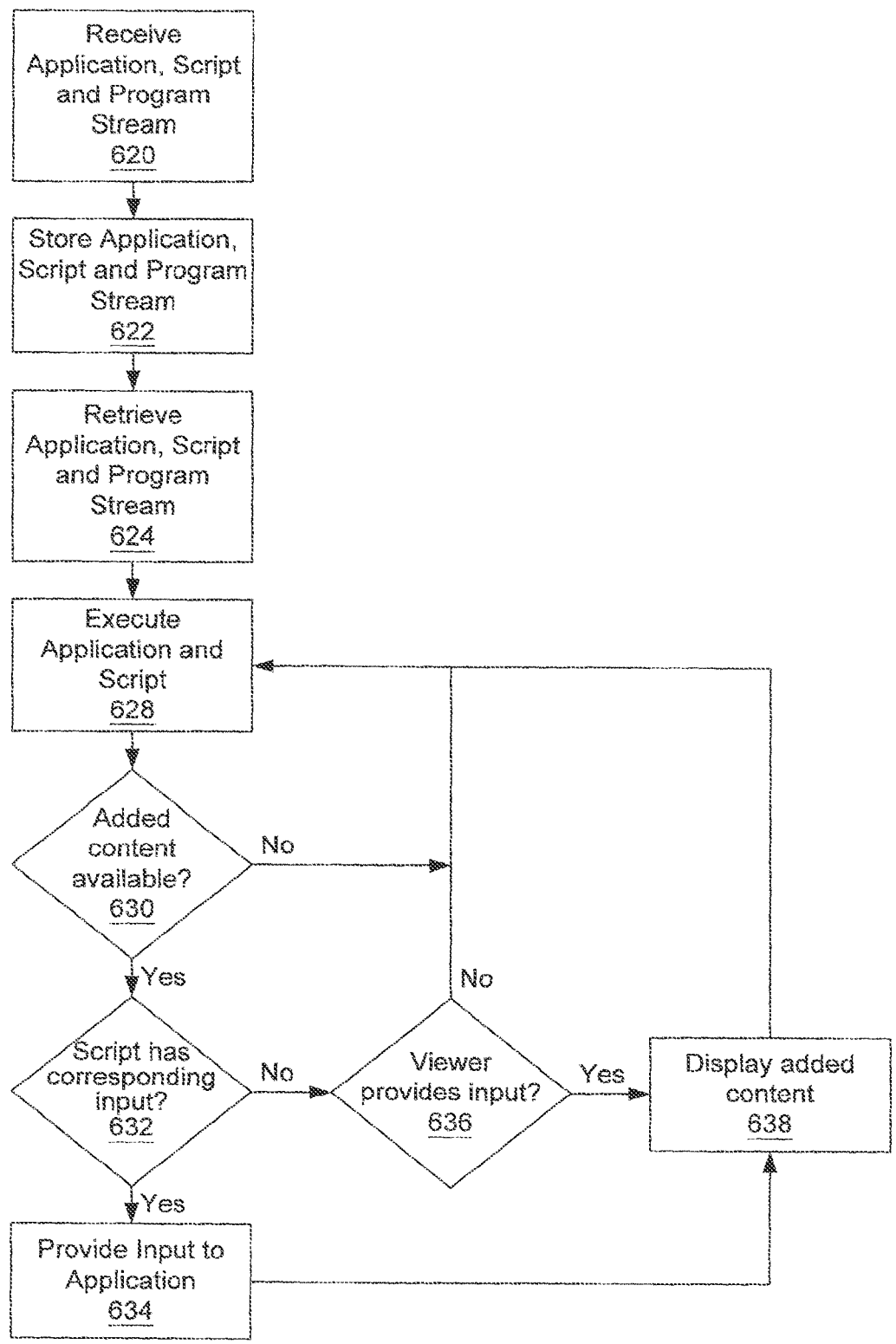
FIG. 6A is a diagram illustrating an alternative method of script usage.

FIG. 6A illustrates an alternative embodiment of a method for script usage. In the embodiment of FIG. 6A, an application, script and corresponding program stream are received (block 620). In the embodiment shown, the corresponding program stream may include added content as described above. Subsequently, the application, script and program stream are stored on a mass storage device (block 622). Such a mass storage device as a hard disk, CD-ROM, DVD, or any other suitable storage device may be used. In a preferred embodiment, the mass storage device comprises a non-volatile storage. Further, the mass storage device utilized may include removal storage media such that stored content may be readily removed from the device for archival purposes, transport to a different location, or any other purpose. Advantageously, program, added content, application, and script data may be recorded at one location and subsequently viewed and executed at a later time or different location. Subsequent to storing the application, script and program stream, the application, script and program stream are retrieved from the mass storage device (block 624). Upon retrieval, the application and script are execute (628) and the corresponding program stream may be displayed on a display device. During execution, added content is made available 630 at a particular time. If script usage is enabled and the script which was received has input at the corresponding time 632, the script makes the corresponding input available to the application 634 and the added content is displayed 638. If the script does not have input available 632, but a viewer actively provides input 636, the added content is displayed 638. If neither the script 632 nor a viewer 636 provides input, execution of the application and script continues 628 without displaying the added content. Advantageously, a viewer may record a program and added content for later viewing at a more convenient time. When the program is viewed at the later time, the viewer may enable or disable the script mechanism to control the display of added content.

Figure 7:
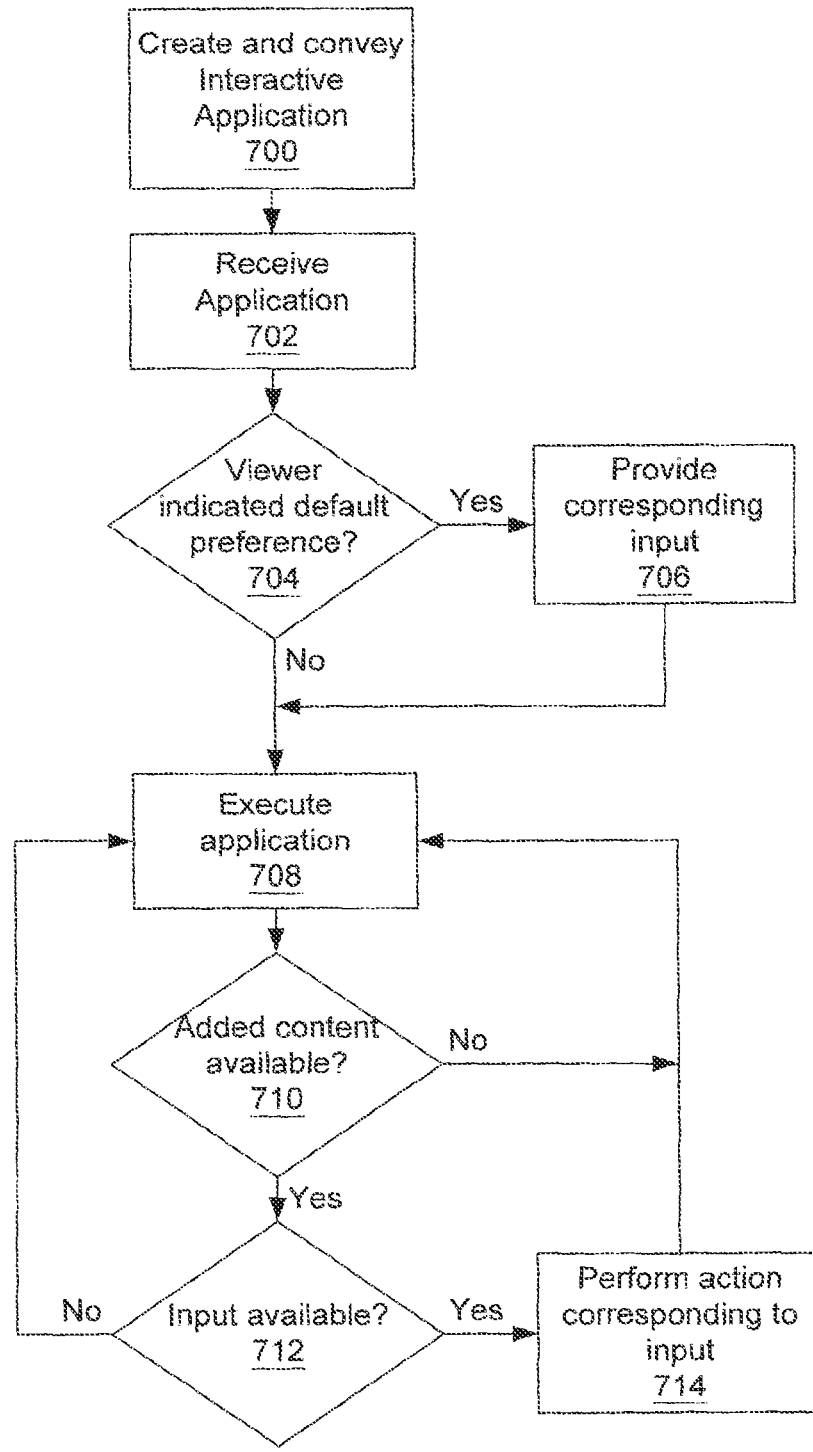
FIG. 7 is a diagram illustrating one method of script usage.

FIG. 7 illustrates an embodiment of script usage wherein a viewer may indicate certain default preferences. An interactive application is created and conveyed 700 and subsequently received 702 by a receiver. The receiver determines whether default script usage preferences have been indicated 704. As described above, such an indication may have been made at an earlier time by a viewer and stored in memory or other storage device. In one embodiment, the operating system software of a receiver is configured to accept input from a viewer indicating preferences and later retrieve those indicated preferences. If viewer default preferences corresponding to script usage are detected 704, input corresponding to those preferences is made available to the interactive application. In the embodiment of FIG. 7, a standardized script may be downloaded or dynamically created by the operating system software of the receiver. The script then provides the corresponding input in a message queue for retrieval by the interactive application, though any suitable mechanism for conveying the input may be utilized. Subsequent to execution 708 of the interactive application, added content may be made available by the interactive application 710. The interactive application may then determine if any input corresponding to the added content is available 712 by accessing the message queue. If input is available 712, the interactive application acts upon the received input 714 (e.g., by displaying an indicated level of added content), and continues execution 708. On the other hand, if no added content is available 710 or no input corresponding to the input is available 712, execution continues 708 without displaying the added content.

In addition to the above embodiments, an interactive application may be configured to display added content by default and receive an indication to not display added content. Similarly, a script may be configured to provide input which indicates particular added content is not to be displayed. Various permutations enabling and disabling script usage and the display of added content and are possible and are contemplated.

Various embodiments may further include receiving, sending or storing instructions and/or data implemented in accordance with the foregoing description upon a carrier medium. Generally speaking, a carrier medium may include transmission media or signals used in broadcast systems and otherwise such as electrical, electromagnetic, or digital signals, conveyed via a communication medium such as network and/or a wireless link. For example, a network operator may convey signals which comprise program instructions via a broadcast system. A carrier medium may also include storage media or memory media such as magnetic or optical media, e.g., disk or CD-ROM, volatile or non-volatile media such as RAM (e.g. SDRAM, RDRAM, SRAM, etc.), ROM, etc.

While the present invention has been described with reference to particular embodiments, it will be understood that the embodiments are illustrative and that the invention scope is not limited to these embodiments. For example, while discussed in terms of television systems, the invention may also be used in the context of a device coupled to the Internet, such as a personal computer or video game platform. In such an embodiment, a user may have a broadband connection to the Web, such as via cable modem or DSL whereby programs, interactive applications and scripts are received. Many variations, modifications, additions and improvements to the embodiments described are possible. These variations, modifications, additions and improvements may fall within the scope of the invention as detailed within the following claims.

What is claimed is:

1. A method for providing added content via an interactive application associated with a media program, the method comprising:
    initiating execution, using one or more hardware processors of a receiving device, of an interactive application while receiving the media program;
    causing, based on the executing of the interactive application, presentation of a user interface configured to receive a user input to view added content via the interactive application;
    accessing, by the one or more hardware processors of the receiving device, a database to identify a stored indication associated with a user;
    executing, at the receiving device, based on the stored indication, a script to provide the user input to the interactive application to provide the added content with the media program, the script comprising a group of instructions; and
    providing, based on the executing of the interactive application and the provided user input, the added content with the media program.

2. The method of claim 1, further comprising:
    receiving, at the receiving device and from a media content system via a network, the media program and the interactive application associated with the media program, the media content system comprising a server, and the media program comprising a video content item.

3. The method of claim 1, further comprising receiving, at the receiving device from a media content system, the script along with the media program and the interactive application.

4. The method of claim 1, the script being stored in the receiving device prior to the receiving of the media program and the interactive application.

5. The method of claim 1, the script being configured to provide the user input at a particular time at which the interactive application presents the user interface configured to receive the user input.

6. The method of claim 1, the script being configured to place the user input in a message queue of the receiving device, the message queue being configured to receive the user input from the user, and the interactive application being configured to retrieve the user input from the message queue.

7. The method of claim 1, further comprising downloading, based on the executing of the interactive application, to the receiving device, the added content in response to the provided user input.

8. The method of claim 1, further comprising:
    receiving, at the receiving device, prior to the receiving of the media program, a second user input to enable use of the script; and
    enabling, at the receiving device, use of the script in the receiving device in response to the second user input.

9. The method of claim 1, the script comprising a default script configured to provide the user input to a plurality of interactive applications comprising the interactive application.

10. The method of claim 9, the provided user input comprising a user preference for one of a plurality of detail levels of added content to be provided by the plurality of interactive applications.

11. The method of claim 10, further comprising:
    receiving, at the receiving device, prior to receiving the media program, a user preference input indicating the one of the plurality of detail levels, the provided user input being based on the user preference input; and
    storing the received user preference input in the database as the stored indication.

12. The method of claim 9, the default script being incorporated within an operating system of the receiving device.

13. The method of claim 1, wherein the method further comprises:
    receiving, at the receiving device and from a media content system via a network, the media program and the interactive application associated with the media program; and
    recording, during the receiving of the media program, the media program and the provided added content for presentation to the user after the recording of the media program and the provided added content.

14. The method of claim 1, wherein the group of instructions includes a first instruction executed based on a first condition and a second instruction executed based on a second condition.

15. The method of claim 1, wherein the group of instructions includes an instruction executed based on one or more conditions.

16. A receiving device, comprising:
    one or more hardware processors; and
    a memory storing instructions that, when executed by at least one of the one or more hardware processors, causes the receiving device to perform operations comprising:
        initiating execution of an interactive application while receiving a media program;
        causing, based on the executing of the interactive application, presentation of a user interface configured to receive a user input to view added content via the interactive application;
        accessing a database to identify a stored indication;
        executing, at the receiving device, based on the stored indication, a script to provide the user input to the interactive application to provide the added content with the media program, the script comprising a group of instructions; and
        providing, based on the executing of the interactive application and the provided user input, the added content with the media program.

17. The receiving device of claim 16, wherein the receiving device is configured as a television set-top box.

18. The receiving device of claim 16, wherein the receiving device is configured as a television.

19. The receiving device of claim 16, wherein the receiving device is configured as a mobile communication device.

20. A non-transitory computer-readable storage medium comprising instructions that, when executed by one or more processors of a receiving device, cause the receiving device to perform operations comprising:
    initiating execution of an interactive application while receiving a media program;

causing, based on the executing of the interactive application, presentation of a user interface configured to receive a user input to view added content via the interactive application;

accessing a database to identify a stored indication;

executing, at the receiving device, based on the accessed indication, a script to provide the user input to the interactive application to provide the added content with the media program, the script comprising a group of instructions; and providing, based on the executing of the interactive application and the provided user input, the added content with the media program.

\* \* \* \* \*